(12) United States Patent
Jo et al.

(10) Patent No.: US 9,979,457 B2
(45) Date of Patent: May 22, 2018

(54) MULTI-BEAMFORMING TRAINING

(71) Applicant: LG ELECTRONICS INC., Seoul (KR)

(72) Inventors: Kyungtae Jo, Seoul (KR); Hangyu Cho, Seoul (KR); Jinmin Kim, Seoul (KR); Eunsung Park, Seoul (KR); Sungjin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 62 days.

(21) Appl. No.: 15/148,902

(22) Filed: May 6, 2016

(65) Prior Publication Data
US 2016/0329947 A1 Nov. 10, 2016

Related U.S. Application Data

(60) Provisional application No. 62/158,537, filed on May 8, 2015, provisional application No. 62/158,539, filed on May 8, 2015.

(51) Int. Cl.
*H04B 7/06* (2006.01)
*H04B 7/0413* (2017.01)
*H04W 16/28* (2009.01)
*H04W 84/12* (2009.01)

(52) U.S. Cl.
CPC ......... *H04B 7/0634* (2013.01); *H04B 7/0413* (2013.01); *H04B 7/0617* (2013.01); *H04W 16/28* (2013.01); *H04W 84/12* (2013.01)

(58) Field of Classification Search
CPC .. H04B 7/0413; H04B 7/0617; H04B 7/0634; H04W 16/28; H04W 84/12
See application file for complete search history.

(56) References Cited

U.S. PATENT DOCUMENTS

| | | | | |
|---|---|---|---|---|
| 2013/0089000 A1* | 4/2013 | Hansen | ............... | H04B 7/0851 370/254 |
| 2013/0308717 A1* | 11/2013 | Maltsev | ............... | H04B 7/0417 375/267 |
| 2015/0289147 A1* | 10/2015 | Lou | ..................... | H04B 7/0408 370/329 |
| 2016/0119043 A1* | 4/2016 | Rajagopal | .............. | H04B 7/088 370/329 |
| 2016/0149633 A1* | 5/2016 | Sanderovich | ......... | G01S 5/0289 375/267 |
| 2016/0190686 A1* | 6/2016 | Gao | ....................... | H01Q 3/24 342/374 |
| 2016/0202344 A1* | 7/2016 | Sanderovich | ............. | G01S 5/06 455/456.1 |

* cited by examiner

*Primary Examiner* — Paul H Masur
(74) *Attorney, Agent, or Firm* — Lee Hong Degerman Kang Waimey

(57) ABSTRACT

A method and apparatus for performing a beamforming training for a multiple input multiple output (MIMO) operation in a wireless local area network is provided. The apparatus assigns at least one of a plurality of sector groups with respect to each of a plurality of array antennas. The apparatus determines a sector used for a data transmission during a sector sweep by transmitting a plurality of sector sweep messages in the plurality of sector groups through the plurality of array antennas to responders simultaneously.

10 Claims, 9 Drawing Sheets

MULTI-BEAMFORMING TRAINING

CROSS-REFERENCE TO RELATED APPLICATIONS

This application claims the benefit of priority of U.S. Provisional applications 62/158,537 filed on May 8, 2015 and 62/158,539 filed on May 8, 2015, all of which are incorporated by reference in their entirety herein.

BACKGROUND OF THE INVENTION

Field of the Invention

The present invention relates to wireless communications, and more particularly, to a method of performing a multi-beamforming training and a device using the same.

Related Art

An IEEE 802.11ad standard is a very high-speed wireless communication standard that operates in a band of 60 GHz or above. Even though a signal can reach about 10 meters, the throughput may support 6 Gbps or more. Since the IEEE 802.11ad standard operates in a high frequency band, signal propagation is dominated by ray-like propagation. As a transmit (TX) or receive (RX) antenna beam is arranged toward a strong spatial signal path, signal quality thereof may be improved.

The IEEE 802.1 lad standard includes a beamforming training process for antenna beam alignment. To achieve throughput of 20 Gbps or more, a next-generation standard that is being developed on the basis of the IEEE 802.11ad is called as an IEEE 802.11ay. One of the key technologies of the IEEE 802.11ay is a multiple input multiple output (MIMO) beamforming technology through an array antenna. The IEEE 802.11ad as a conventional technology supports a single stream transmission using one array antenna, and a next-generation technology (e.g. IEEE 802.11ay) thereof supports multi-stream transmission using a plurality of antenna arrays.

To apply the plurality of array antennas, it is required that a plurality of independent beamformings are performed, However this may cause severe interference between a plurality of streams and an increase of time required for the beamformings. A method will be proposed to minimize the interference between the streams and reduce the time required for the beamformings.

SUMMARY OF THE INVENTION

The present invention provides a method for performing a beamforming training for a multiple input multiple output (MIMO) operation in a wireless local area network.

The present invention also provides an apparatus for performing a beamforming training for a MIMOMIMO operation in a wireless local area network.

In an aspect, a method for performing a beamforming training for a MIMO in a wireless local area network is provided. The method includes setting up a plurality of sector groups, assigning at least one of the plurality of sector groups with respect to each of a plurality of array antennas, during a sector sweep, determining a sector used for a data transmission by transmitting a plurality of sector sweep messages in the plurality of sector groups through the plurality of array antennas to responders simultaneously, and adjusting an antenna weight vector for the plurality of array antennas during a beam refinement protocol (BRP).

Angles between a plurality of beams transmitted from a plurality of sectors that belong to each of the plurality of sector groups may be all the same.

In another aspect, an apparatus for performing a beamforming training for a MIMO operation in a wireless local area network is provided. The apparatus includes a plurality of array antennas, a plurality of transceivers configured to receive and transmit a radio signal through the plurality of array antennas, and a processor operatively connected to the plurality of transceivers. The processor is configured to set up a plurality of sector groups, assign at least one of the plurality of sector groups with respect to each of a plurality of array antennas, during a sector sweep, determine a sector used for a data transmission by transmitting a plurality of sector sweep messages in the plurality of sector groups through the plurality of array antennas to responders simultaneously, and adjust an antenna weight vector for the plurality of array antennas during a beam refinement protocol (BRP).

DESCRIPTION OF EXEMPLARY EMBODIMENTS

Below, a wireless communication system that operates at a frequency band of 60 GHz or 45 GHz or above will be exemplarily described. A plurality of channels may be provided. For example, one channel may have a bandwidth of 2.16 GHz.

A station (STA) may be referred to as various names such as a wireless device, a mobile station (MS), a network interface device, a wireless interface device, or a user. Unless a function of the station (STA) is separated from that of an access point (AP), the STA may include a non-AP STA or an AP. When a communication between the STA and the AP is described, the STA may be interpreted as the non-AP STA. When a communication between a STA and a STA is described or when a specific AP function is not required, the STA may be the non-AP STA or the AP.

Figure 1:
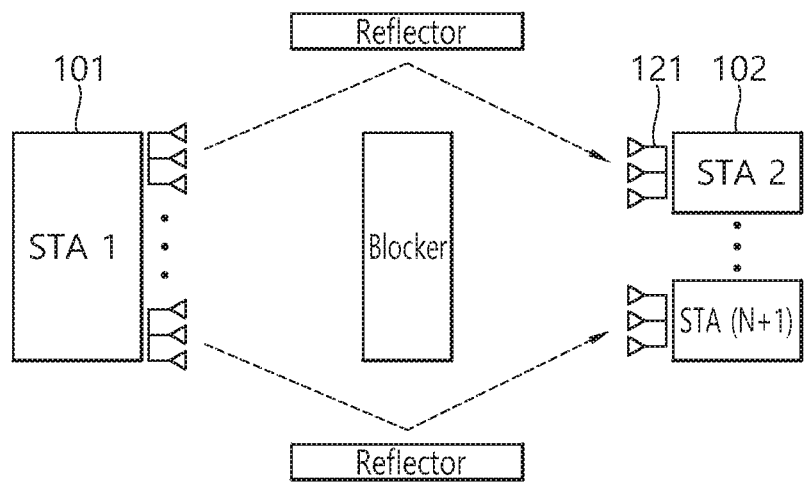
FIG. 1 is a diagram illustrating an example of a multiple input multiple output (MIMO) operation using a plurality of array antennas.

FIG. 1 is a diagram illustrating an example of a multiple input multiple output (MIMO) operation using a plurality of array antennas.

A STA1 101 may be an initiator that starts beamforming (BF) training. A STA2 102 that participates in the BF training may be a responder. The responder may include a plurality of STAs. The STA1 101 may include a plurality of array antennas, and the STA2 102 may include at least one array antenna 121. A MIMO operation relates to simultaneous transmission/reception of multiple spatial streams. Each array antenna may be used for transmission/reception of a spatial stream in a sector at a time.

The sector may correspond to a specific antenna beam or pattern. A transmit (TX) sector may be a sector for a TX antenna, and a receive (RX) sector may be a sector for a RX antenna.

Figure 2:
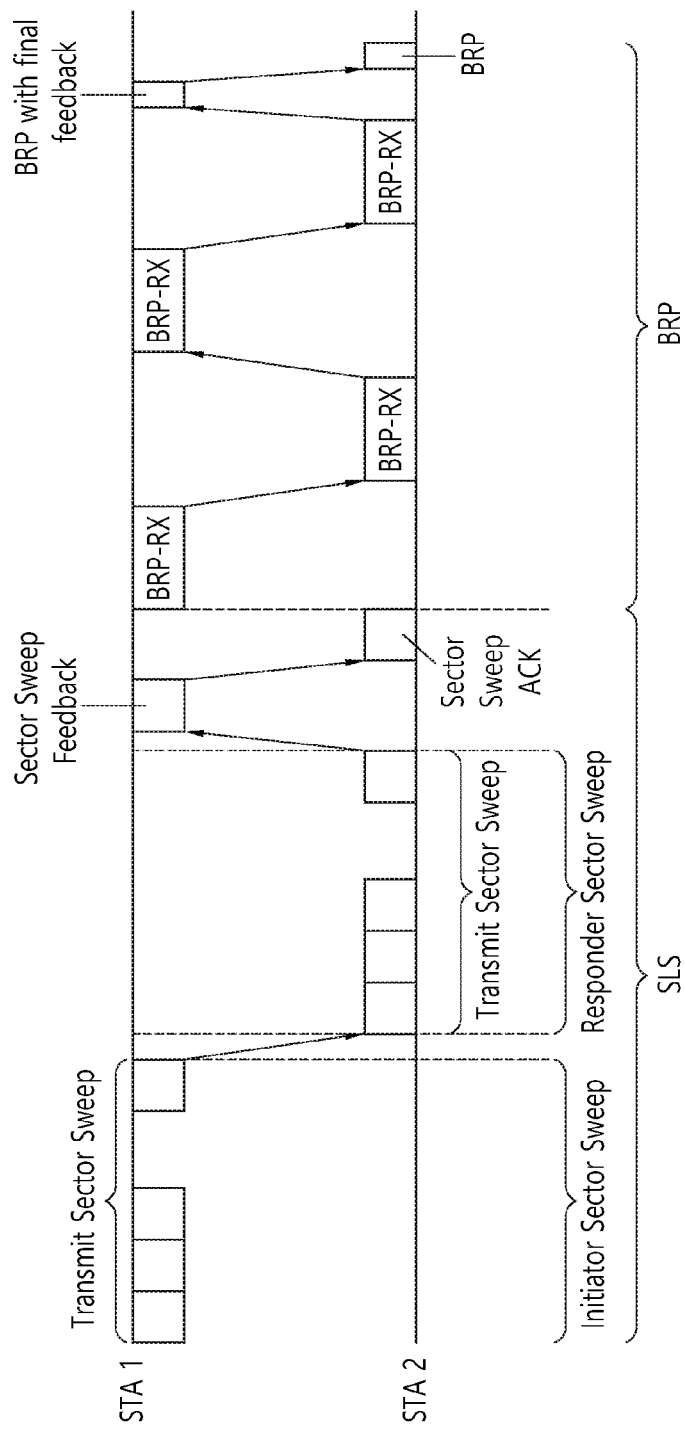
FIG. 2 is a diagram illustrating a beamforming (BF) training process according to the related art.

FIG. 2 is a diagram illustrating a BF training process according to the related art. This may refer to section 9.35 of the IEEE 802.11ad standard.

The BF training may provide transmission of a BF training frame using a sector sweep (SSW) and signaling required for each STA to determine setting an appropriate antenna system. The BF training process may include a sector level sweep (SLS) process and a beam refinement protocol (BRP) process. The SLS process for the sector sweep may be to communicate such that a control physical layer (PHY) is provided between the STAs. The BRP process may provide a refinement of an antenna weight vector between a transmitter and a receiver.

First, the STA1 as the initiator may transmit a sector sweep (SSW) message. The sector sweep message may include a directional multi-gigabit (DMG) beacon frame and/or a sector sweep (SSW) frame. During the sector sweep, the STA1 may send the sector sweep message through all sectors.

The STA2 as the responder may respond to the sector sweep message. A sector sweep message of the responder may be the SSW frame.

The STA1 that receives a sector sweep of the STA2 may send a sector sweep feedback to the STA2. The sector sweep feedback may include information about a sector and an antenna of a frame, which has the best quality, from among frames received from the responder. Furthermore, the sector sweep feedback may include information about a signal to noise ratio (SNR) measured in a frame having the best quality.

The STA2 may send a sector sweep Ack to the STA1. The sector sweep Ack may be transmitted through a sector specified by the lastly received sector sweep feedback.

A sector (a TX sector and/or a RX sector) in which an initiator has the best quality and a sector (a TX sector and/or a RX sector) in which a responder has the best quality may be determined through the SLS process.

When the SLS process is completed, the STA may initiate the BRP process to perform beamforming training of the TX and RX antenna array. The BRP process may include a BRP setup subphase, a multiple sector ID detection (MID) subphase, and a beam combining (BC) subphase.

Hereinafter, BF training using a plurality of antenna arrays will be described.

Figure 3:
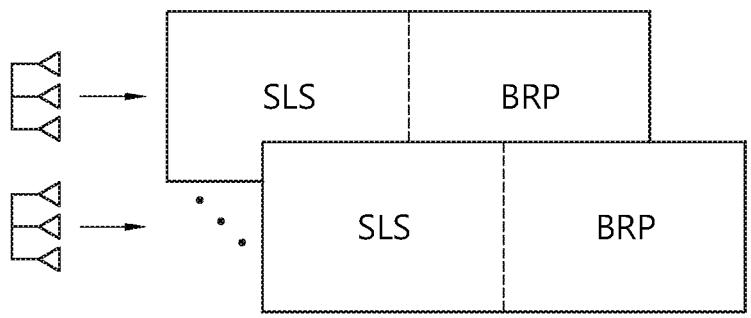
FIG. 3 is a diagram illustrating beamforming (BF) training according to an embodiment of the present invention.

FIG. 3 is a diagram illustrating a BF training according to an embodiment of the present invention.

A plurality of BF trainings may be simultaneously performed with respect to a plurality of array antennas, respectively. This may mean that the plurality of array antennas perform the plurality of BF trainings at the same time.

Before sending the sector sweep message, the plurality of BF trainings may be adjusted such that sectors do not overlap each other. For example, it may be assumed that there are 10 sectors indexed from 0 to 9. BF training for a first array antenna may initiate from sector 0, and BF training for a second array antenna may initiate from sector 5.

After performing each independent BF training process, the best beam for transmission and reception may be selected in each link.

Figure 4:
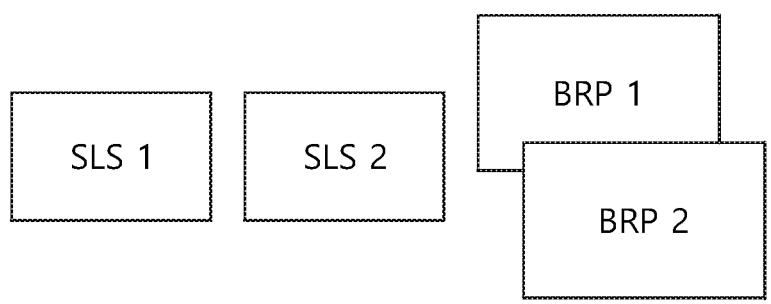
FIG. 4 is a diagram illustrating beamforming (BF) training according to another embodiment of the present invention.

FIG. 4 is a diagram illustrating beamforming (BF) training according to another embodiment of the present invention.

A SLS1 indicates a SLS process for a first array antenna, a SLS2 indicates a SLS process for a second array antenna, a BRP1 indicates a BRP process for the first array antenna, and a BRP2 illustrates a BRP process for the second array antenna.

A plurality of SLS processes may be sequentially performed by a plurality of array antennas, respectively. However, a plurality of BRP processes may be performed parallelly with respect to a plurality of array antennas.

One or more candidate sectors with respect to each array antenna may be determined through the SLS processes which are sequentially performed. The best beam for each array antenna may be determined in the candidate sectors determined during a plurality of BRP processes performed parallelly.

Figure 5:
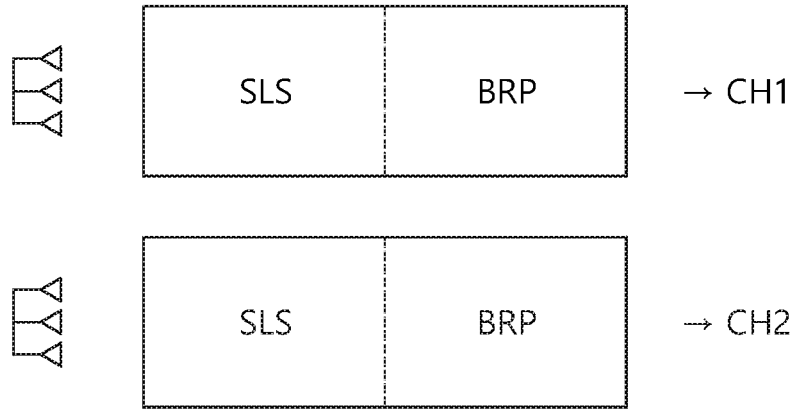
FIG. 5 is a diagram illustrating beamforming (BF) training according to still another embodiment of the present invention.

FIG. 5 is a diagram illustrating BF training according to another embodiment of the present invention.

A plurality of BF trainings may be simultaneously performed with respect to a plurality of array antennas. However, the plurality of BF trainings may be performed on different channels. For example, a first BF training for a first array antenna may be performed on a first channel, and a second BF training for a second array antenna may be performed on a second channel.

Figure 6:
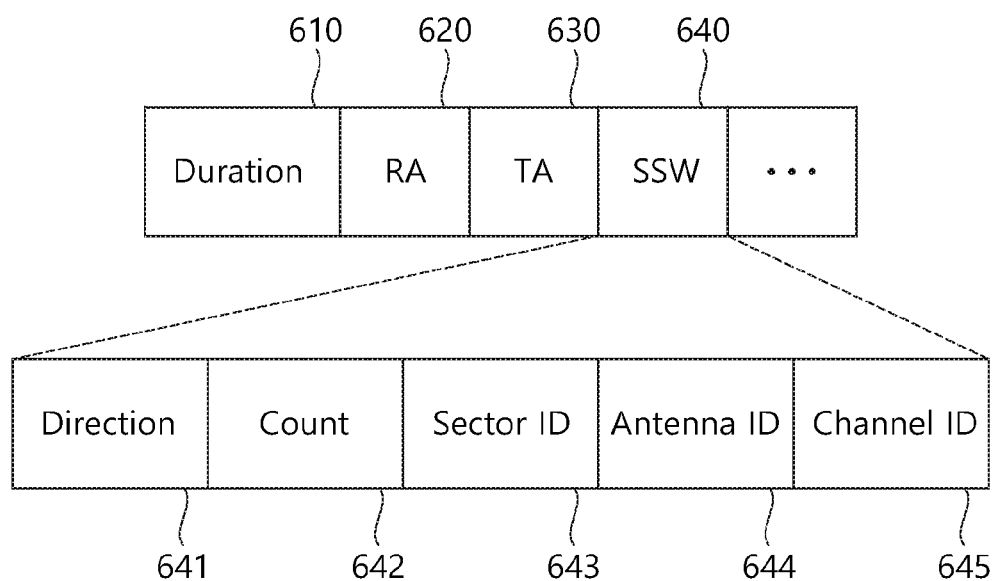
FIG. 6 is a diagram illustrating an example of a sector sweep (SSW) frame format to perform a beamforming (BF) training for each channel.

FIG. 6 is a diagram illustrating an example of a SSW frame format to perform a BF training operation for each channel.

A SSW frame may include a duration field 610, a receiver address (RA) field 620, a transmitter address (TA) field 630, and a SSW field 640.

The duration field 610 is set to the time until the end of the SSW frame transmission that has a value of its count field 642 equal to 0.

The RA field 620 indicates an address of the STA that receives a corresponding SSW frame.

The TA field 630 indicates an address of the STA that transmits the corresponding SSW frame.

The SSW field 640 may include a direction field 641, a count field 642, a sector ID field 643, an antenna ID field 644 and a channel ID field 645. The direction field 641 may be set to zero to indicate that corresponding frame is transmitted by an initiator, and the direction field 641 may be set to one to indicate that the corresponding frame is transmitted by a responder. The count field 642 indicates the number of times of the remaining SSW frame transmissions. The sector ID field 643 indicates a sector through which the corresponding frame is transmitted. The antenna ID field 644 indicates an antenna that the transmitter is currently using for this frame. The channel ID field 645 indicates a channel through which the corresponding frame is transmitted by the transmitter.

Figure 7:
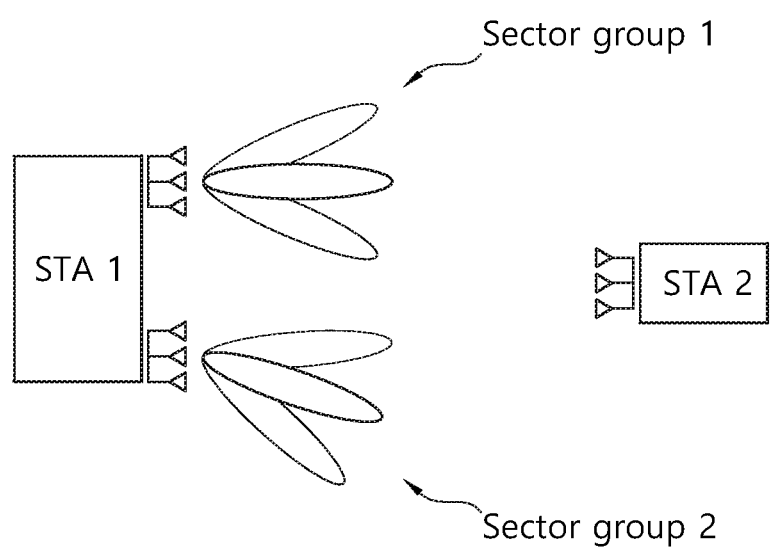
FIG. 7 is a diagram illustrating beamforming (BF) training according to another embodiment of the present invention.

FIG. 7 is a diagram illustrating a BF training according to another embodiment of the present invention.

All sectors may be divided into a plurality of sector groups. For example, when there are two array antennas, all sectors may be divided into first and second sector groups.

Angles between a plurality of beams transmitted from a plurality of sectors that belong to each sector group may be all the same. For example, when three sectors are in a sector group, angles between three beams transmitted from the three sectors are the same as each other. Accordingly, when a 30 degree angle between a first beam and a second beam is formed, a 30 degree angle between the second beam and a third beam may also be formed. Angles between beams of each of the sector groups may be all the same. Alternatively, angles between beams may be specified by a plurality of sector groups.

During the SLS process, each array antenna may perform a sector sweep with respect to a sector in a corresponding sector group to set up the best sector. For example, a first array antenna may perform a sector sweep with respect to a first sector group, and a second array antenna may perform a sector sweep with respect to a second sector group.

On the other hand, because of the characteristic of communication using a high frequency band, a STA may be in a fixed position, almost no mobility. Accordingly, in the case where the BF training is previously completed, it may be efficient to perform current BF training based on the previously selected sector. Thus, in the case where the responder has previously performed the BF training, the initiator may select a sector group including the responder and the set sector to perform BF training with respect to the selected sector group. Alternatively, according to the signal quality (e.g., signal-to-interference-plus-noise ratio (SINR)) based on the result of the BF training which is previously performed, the priority of the sector group with respect to BF training to be currently performed may be set. That is, as a corresponding sector group has a higher SINR, the corresponding sector group may have a higher priority.

In the case where there is a plurality of responders who have a link to be formed simultaneously, a plurality of STA groups may be divided for each STA group, and thus the BF training may be performed for each STA group. A plurality of STAs to be transmitted at the same time or STAs that do not interfere with each other may be grouped together.

Figure 8:
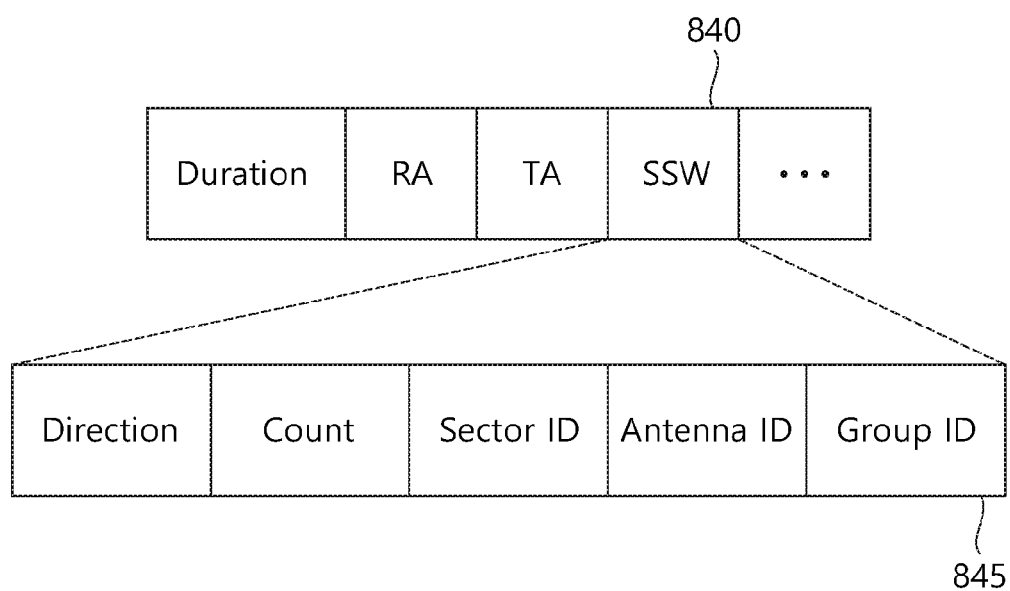
FIG. 8 is a diagram illustrating an example of a sector sweep (SSW) frame format to perform beamforming (BF) training for each sector group.

FIG. 8 a diagram illustrating an example of a SSW frame format to perform a BF training for each sector group.

A SSW field 840 of the SSW frame may include a group ID field 845 indicating a sector group. The remaining fields are the same as an embodiment of FIG. 6. Additionally, when a SSW is performed for each channel with respect to a sector group, a SSW frame may further include a field about a channel through which a corresponding frame is transmitted.

Figure 9:
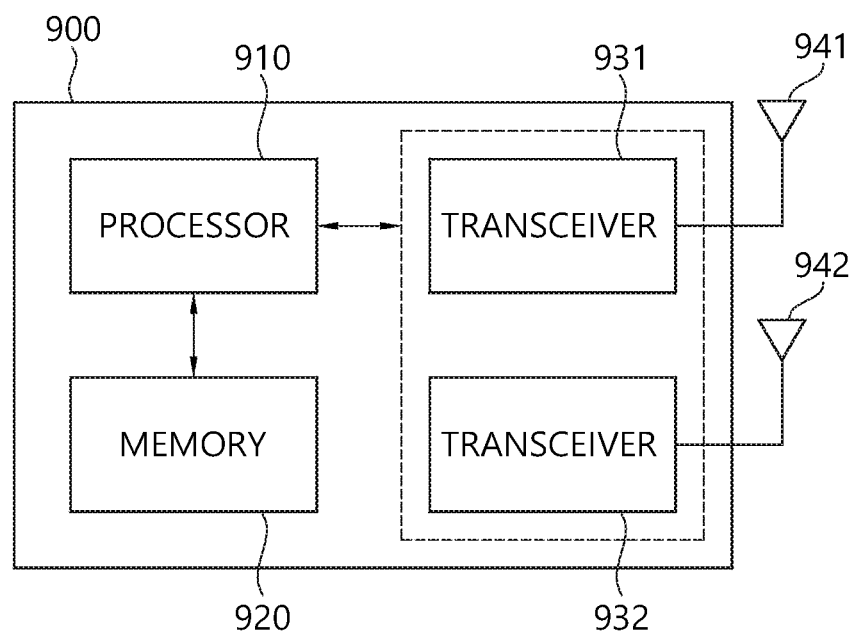
FIG. 9 is a block diagram illustrating a station (STA) which implements an embodiment of the present invention.

FIG. 9 is a block diagram illustrating a STA which implements an embodiment of the present invention.

A STA 900 may include a processor 910, a memory 920, a plurality of transceivers 931 and 932, and a plurality of array antennas 941 and 942. The transceivers 931 and 932 may receive a radio signal through the array antennas 941 and 942 to convert the received radio signal into a baseband signal and may send the converted baseband signal to a processor 910. The transceivers 931 and 932 may receive the baseband signal from the processor 910 to convert the received baseband signal into a wireless signal (e.g., a radio signal) to send the converted wireless signal through the array antennas 941 and 942. The processor 910 may perform the operation of the STA according to the above-described embodiment. The memory 920 may store instructions necessary for the operation of the STA.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a beamforming training for a multiple input multiple output (MIMO) operation in a wireless local area network, the method comprising:
   setting up a plurality of sector groups;
   assigning at least one of the plurality of sector groups with respect to each of a plurality of array antennas;
   during a sector sweep, determining a sector used for a data transmission by transmitting a plurality of sector sweep messages in the plurality of sector groups through the plurality of array antennas to responders simultaneously,
   wherein the plurality of sector sweep messages includes a plurality of sector sweep (SSW) frames, each SSW frame comprising information indicating a sector, an antenna and a sector group through which a corresponding SSW frame is to be transmitted; and
   adjusting an antenna weight vector for the plurality of array antennas during a beam refinement protocol (BRP).

2. The method of claim 1, wherein angles between a plurality of beams transmitted from a plurality of sectors that belong to each of the plurality of sector groups are all the same.

3. The method of claim 1, wherein a sector group comprising a used sector in which the responder has previously performed beamforming training is firstly assigned to a corresponding one of the plurality of array antennas.

4. The method of claim 1, wherein each SSW frame includes information indicating a channel through which a corresponding SSW frame is to be transmitted.

5. The method of claim 1, wherein the wireless local area network operates in a frequency band of 45 GHz or above.

6. An apparatus for performing a beamforming training for a multiple input multiple output (MIMO) operation in a wireless local area network, the apparatus comprising:
   a plurality of array antennas;
   a plurality of transceivers configured to receive and transmit a radio signal through the plurality of array antennas; and
   a processor operatively connected to the plurality of transceivers and configured to:

set up a plurality of sector groups;

assign at least one of the plurality of sector groups with respect to each of a plurality of array antennas;

during a sector sweep, determine a sector used for a data transmission by transmitting a plurality of sector sweep messages in the plurality of sector groups through the plurality of array antennas to responders simultaneously, wherein the plurality of sector sweep messages includes a plurality of sector sweep (SSW) frames, each SSW frame comprising information indicating a sector, an antenna and a sector group through which a corresponding SSW frame is to be transmitted; and adjust an antenna weight vector for the plurality of array antennas during a beam refinement protocol (BRP).

7. The apparatus of claim 6, wherein angles between a plurality of beams transmitted from a plurality of sectors that belong to each of the plurality of sector groups are all the same.

8. The apparatus of claim 6, wherein a sector group comprising a used sector in which the responder has previously performed beamforming training is firstly assigned to a corresponding one of the plurality of array antennas.

9. The apparatus of claim 6, wherein each SSW frame includes information indicating a channel through which a corresponding SSW frame is to be transmitted.

10. The apparatus of claim 6, wherein the wireless local area network operates in a frequency band of 45 GHz or above.

* * * * *